United States Patent Office 2,732,366
Patented Jan. 24, 1956

2,732,366

VINYL AROMATIC RESIN COMPOSITIONS CONTAINING A PLURALITY OF LIGHT STABILIZING AGENTS

Bernard H. Tubbs, Clare, and Floyd B. Nagle and Paul C. Woodland, Midland, Mich., assignors to The Dow Chemical Company, Midland, Mich., a corporation of Delaware No Drawing. Application July 30, 1954,
Serial No. 446,972

9 Claims. (Cl. 260—45.8)

This invention concerns compositions of matter comprising polymers of vinyl aromatic hydrocarbons and certain improved combinations of addition agents as light stabilizers for the polymers.

Polystyrene is known to possess desirable properties which render it useful for a wide variety of purposes. It is a clear, colorless, transparent thermoplastic resin having exceptional dielectric properties and a high refractive index. These properties render it useful for the preparation of molded articles suitable for a variety of purposes in the home and industry. These same properties and uses are shared to more or less extent by other resinous polymers of one or more monovinyl aromatic hydrocarbons such as vinyltoluene, vinylxylene, ethylvinylbenzene, ethylvinyltoluene, isopropylvinylbenzene, or copolymers of a major proportion of at least one monovinyl aromatic hydrocarbon and a minor proportion of an alkenyl aromatic hydrocarbon such as alpha-methylstyrene or para-methyl-alpha-methylstyrene.

Polystyrene and other vinyl aromatic resins tend to undergo gradual discoloration upon exposure to light such as may occur upon weathering, i. e. upon exposure to out-of-doors atmospheric conditions, or upon exposure to the effects of light, such as light from a carbon electrode arc lamp, an S-1 sunlamp, or a fluorescent electric lamp. This property of vinyl aromatic resins to discolor upon exposure to the action of light detracts from the utility of the vinyl aromatic resins for many of the purposes to which they are otherwise well suited. For this reason much attention has been given to the selection of addition agents for the incorporation in a vinyl aromatic resin to protect the resin against the adverse effects of light.

Among the more effective of the stabilizing agents heretofore proposed for vinyl aromatic resins, are the alkanolamines such as diethanolamine, diisopropanolamine, triethanolamine, triisopropanolamine, N-dibutylethanolamine, or N-ethyldiethanolamine, which are disclosed and claimed in U. S. Patent No. 2,287,188 to Matheson and Boyer. While such alkanolamines are effective stabilizing agents in concentrations of from 0.1 to 3 per cent, for preventing or retarding the discoloration of vinyl aromatic resins upon exposure to visible light, e. g. light from a carbon electrode arc lamp, they have the disadvantage of providing less stabilizing action against light of all wave lengths or light of different wave lengths such as artificial light from an S-1 sunlamp, or out-of-doors light, than is desired.

It has now been found that certain combinations of addition agents, more specifically, an alkanolamine and an organic salicylate such as methyl salicylate or ethylene glycol disalicylate, to be defined more fully hereinafter, can be incorporated with a polymer of one or more monovinyl aromatic hydrocarbons, including copolymers of a major proportion of a monovinyl aromatic hydrocarbon and a minor proportion of an alkenyl aromatic hydrocarbon such as alpha-methylstyrene, or para-methyl-alpha-methylstyrene, to provide a resinous composition stabilized against the effects of ultraviolet radiations having a wide range of wave lengths from both natural and artificial sources.

It has also been discovered that combinations of an alkanolamine and an organic salicylate can be employed in proportions to be defined more fully hereinafter, to provide a stabilized polymeric monovinyl aromatic hydrocarbon product, including copolymers of a major proportion of a monovinyl aromatic hydrocarbon and a minor proportion of an alkenyl aromatic hydrocarbon such as alpha-methylstyrene, or para-methyl-alpha-methylstyrene, which stabilized product possesses greater resistance to the adverse effects of light, e. g. undergoes less discoloration upon exposure to light, than is obtained by employing a similar amount of either the alkanolamine, or the ester of salicylic acid, alone, or in combination in proportions other than hereinafter specified, when such compositions are exposed to the action of light of varying wave lengths such as out-of-doors weathering, i. e. sunlight, or light having wave lengths within the range of that emitted from an S-1 sunlamp and a carbon electrode arc lamp.

It has further been found that combinations of the addition agents in proportions relative to one another corresponding to from 10 to 90 per cent by weight of the alkanolamine and from 90 to 10 per cent by weight of the ester of salicylic acid, based on the sum of the weights of said agents, have a cooperative effect to provide stabilization of a polymeric monovinyl aromatic hydrocarbon product against the adverse effects of light and particularly against discoloration of the polymer upon exposure to light where there is a high concentration of ultraviolet radiations of varying wave lengths, e. g. corresponding to light from both an S-1 sunlamp and light from a carbon electrode arc lamp, which is greater than is obtained by employing either of the stabilizing agents in similar proportions alone, for preventing discoloration of the polymer upon exposure to such light.

According to the invention a composition of matter comprising a polymer of at least one monovinyl aromatic hydrocarbon of the benzene series, or a copolymer of a major proportion of at least one such monovinyl aromatic hydrocarbon and a minor proportion of an alkenyl aromatic hydrocarbon of the benzene series such as alpha-methylstyrene or para-methyl-alpha-methylstyrene, can readily be stabilized against discoloring upon exposure to light by incorporating with the polymer a total amount of from 0.08 to 4 per cent by weight of at least two addition agents consisting of at least one alkanolamine and at least one organic salicylate in proportions corresponding to from 10 to 90 per cent by weight of the alkanolamine and from 90 to 10 per cent of the salicylate, based on the sum of the weights of the addition agents.

As the polymeric monovinyl aromatic hydrocarbon product, to be stabilized, there may be employed the resinous thermoplastic polymers of one or more monovinyl aromatic hydrocarbons of the benzene series such as styrene, vinyltoluene, vinylxylene, ar-ethylvinylbenzene, ar-ethylvinyltoluene, isopropylvinylbenzene, or copolymers of a major proportion of at least one monovinyl aromatic hydrocarbon of the benzene series and a minor proportion of an alkenyl aromatic hydrocarbon of the benzene series such as alpha-methylstyrene or para-methyl-alpha-methylstyrene. Polymeric monovinyl aromatic hydrocarbon products such as polystyrene, polyvinyltoluene, copolymers of styrene and vinyltoluene, and copolymers of from 15 to 40 per cent by weight of alpha-methylstyrene and from 85 to 60 per cent of styrene, or vinyltoluene, are preferred.

The alkanolamine to be employed in preparing the compositions of the invention have the general formula:

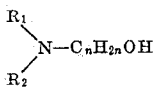

wherein $n$ is an integer from 2 to 3, $R_1$ and $R_2$ represent at least one member of the group consisting of hydrogen, an alkyl radical containing from 1 to 4 carbon atoms, the radical $-C_nH_{2n}OH$ wherein $n$ is an integer from 2 to 3, and the bivalent radical:

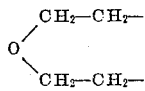

wherein both valences are attached to the nitrogen atom of the alkanolamine, the representation of the monovalent members just mentioned being by $R_1$ and $R_2$ individually and of said bivalent radical being by $R_1$ and $R_2$ collectively.

Any primary-, secondary-, or tertiary-alkanolamine having the aforementioned general formula can be employed as the alkanolamine addition agent. Examples of suitable alkanolamines are ethanolamine, isopropanolamine, diethanolamine, diisopropanolamine, N-methyldiethanolamine, N-butyldiethanolamine, N-methyldiisopropanolamine, N-dimethylethanolamine, triethanolamine, triisopropanolamine, N-(2-hydroxyethyl)diisopropanolamine, N-(2-hydroxypropyl)diethanolamine, 2-(morpholino)ethanol, 1-(2-morpholino)2-propanol, or mixtures of any two or more of such alkanolamines. Alkanolamine having a boiling point above 200° C. at atmospheric pressure, e. g. diisopropanolamine, are preferred.

The alkanolamine is employed in amount corresponding to from 0.04 to 2, preferably from 0.05 to 1 per cent by weight of the polymer.

The salicylate addition agent can be an ester of salicyclic acid and a saturated aliphatic alcohol containing from one to eight carbon atoms in the molecule, or a disalicylate of ethylene glycol or propylene glycol. The salicylate addition agent can be one or more of the esters of salicylic acid selected from the group consisting of ethylene glycol disalicylate, propylene glycol disalicylate and esters of salicylic acid having the general formula:

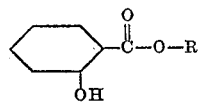

wherein R represents an alkyl radical containing from 1 to 8 carbon atoms.

The salicylic acid ester is employed in amount corresponding to from 0.04 to 2, preferably from 0.05 to 1, per cent by weight of the polymer.

The alkanolamine and the salicylate are employed in combination and in total amount corresponding to from 0.08 to 4, preferably from 0.1 to 2, per cent by weight of the polymer. The alkanolamine and the salicylate addition agents can be employed in proportions corresponding to from 10 to 90 per cent by weight of the alkanolamine and from 90 to 10 per cent of the salicylate, based on the sum of the weights of said agents. Best results are usually obtained by employing the addition agents in proportions corresponding to from 60 to 70 per cent by weight of the alkanolamine and from 40 to 30 per cent of the ester of salicylic acid, based on the sum of the weights of said agents.

The stabilizing agents can be incorporated with the polymer in any of several ways. Satisfactory results have been obtained by adding the alkanolamine and the salicylate to the polymer in granular form, tumbling the mixture in a blender to uniformly distribute said agents over surfaces of the polymer granules, passing the mixture through a plastics extruder wherein the polymer is fused and extruded through a nozzle or other suitable outlet, then cooled and cut or ground to a granular form suitable for molding. The stabilizing agents may be added to the monomeric vinyl aromatic compound or a mixture of two or more monomers, e. g. a mixture of styrene and alpha-methylstyrene, before polymerization and the polymerization be carried out in the presence of the stabilizing agents. The stabilizing agents and the polymer may be dissolved in a volatile neutral solvent and the latter thereafter be evaporated. The polymer may be heat-plastified or fused by heating the same in a Banbury mixer or in a plastics extruder and the addition agents mixed therewith in the desired proportions, preferably in the absence or substantial absence of air or oxygen.

In a preferred practice, the alkanolamine and the salicylate addition agents are incorporated with the heat-plastified polymer by concurrently introducing or feeding the alkanolamine and the salicylate into a stream of the fused polymer in a plastics extruder. The alkanolamine and the salicylate are preferably fed into admixture with the polymer as separate or individual streams of said agents. The mode of incorporating the addition agents with the polymer is of minor importance, but it is desirable that the agents be distributed as uniformly as possible throughout the mass.

Small amounts of other agents such as plasticizers, pigments, dyes, lubricants or flow agents, can also be incorporated with the polymer, if desired.

The following examples illustrate practice of the invention and describe the action of particular concentrations of a few of the many combinations of the alkanolamines and the esters of salicylic acid which have been tested and found to be useful in the present invention, but are not to be construed as limiting its scope.

EXAMPLE 1

In each of a series of experiments, a charge of 1000 grams of granular polystyrene containing 1 per cent by weight of white mineral oil as lubricant was placed in a glass jar, together with methyl salicylate and diisopropanolamine in amounts as stated in the following table, based on the weight of the starting materials. The mixture was tumbled in the jar until the addition agents were uniformly distributed throughout the granular polystyrene. Thereafter, the mixture was fed into a laboratory extruder having a 1-inch diameter screw wherein it was heated to temperatures between 360° and 380° F. and extruded through a ⅛-inch diameter die at temperatures between 400° and 410° F. The extruded product was cooled and cut to a granular form suitable for molding. A portion of the composition was injection molded to form test pieces of 2 x 2.5 inches by 0.1 inch thick. These test pieces were used to determine the degree of yellowing of the polystyrene upon exposure to light. The procedure for determining the degree of yellowness was to obtain a light transmission curve for each test piece for light having wave lengths between 420 and 620 millimicrons before exposure of a test bar to light rich in ultraviolet light and after exposure of a bar to such ultraviolet light. The difference between the per cent transmission value at 620 millimicrons and 420 millimicrons is taken as the measure of the degree of yellowness of any particular sample and is called the yellowness index. The yellowing due to exposure of a test piece to light rich in ultraviolet rays is obtained by subtracting the yellowness index obtained before exposure of a test piece to the light containing a high proportion of ultraviolet light from the yellowness index after exposure to such light. This difference is a measure of the yellowing due to the exposure of the test piece to the light containing a high proportion of ultraviolet light. The test pieces of the composition were exposed to rays from an S-1 Sunlamp (General Electric Company) for a period of 500 hours employing a procedure similar to that described in ASTM D620-49. Other test pieces of the composition were exposed to light from a carbon electrode arc lamp in a standard Fadeometer for a period of 500 hours. The yellowness index of the polystyrene before and after exposure and the yellowing of the polystyrene due to exposure to light was determined as previously described. The results obtained with varying proportions of the methyl salicylate and the diisopropanolamine stabilizing agents are given in Table I. For purpose of comparison molded test pieces of polystyrene without the stabilizing agents were prepared and tested for yellowing by light in a similar manner. The table also gives the yellowing for a composition of polystyrene and methyl salicylate and for a composition of polystyrene and diisopropanolamine as the sole stabilizing agent, respectively.

*Table I*

| Run No. | Starting Materials | | | Color of Product | | | | | |
|---|---|---|---|---|---|---|---|---|---|
| | Percent Polystyrene | Percent Methyl Salicylate | Percent Diisopropanolamine | S-1 Sunlamp | | | Fadeometer | | |
| | | | | Yellowness Index | | Yellowing | Yellowness Index | | Yellowing |
| | | | | Before Exposure | After Exposure | | Before Exposure | After Exposure | |
| 1 | 100 | 0 | 0 | 2.4 | 11.5 | 9.1 | 2.4 | 26.9 | 24.5 |
| 2 | 99.2 | 0.8 | 0 | 3.2 | 5.6 | 2.4 | 3.2 | 14.8 | 11.6 |
| 3 | 99.2 | 0 | 0.8 | 2.8 | 7.8 | 5.0 | 2.7 | 3.5 | 0.8 |
| 4 | 99.2 | 0.08 | 0.72 | 2.4 | 4.1 | 1.7 | 2.5 | 2.6 | 0.1 |
| 5 | 99.2 | 0.24 | 0.56 | 2.5 | 3.4 | 0.9 | 2.5 | 2.5 | 0.0 |
| 6 | 99.2 | 0.56 | 0.24 | 2.7 | 3.7 | 1.0 | 3.0 | 3.2 | 0.2 |
| 7 | 99.2 | 0.72 | 0.08 | 3.0 | 3.5 | 0.5 | 3.2 | 8.7 | 5.5 |

EXAMPLE 2

In each of a series of experiments, a charge of 1000 grams of granular polystyrene containing one per cent by weight of white mineral oil as lubricant was placed in a glass bottle, together with methyl salicylate and diisopropanolamine, in amounts based on the weight of the starting materials as stated in the following table. The mixture was tumbled until the added agents were uniformly dispersed with the polystyrene. The mixture was fed to a laboratory extruder wherein it was fused and extruded at temperatures between 400° and 410° F., then cooled and cut to a granular form suitable for molding. A portion of each composition was injection molded to form test pieces 2 x 2.5 inches by 0.1 inch thick. The test pieces were used to determine a yellowing for the composition upon exposure to light employing a procedure similar to that employed in Example 1. Table II identifies the composition by giving the per cent by weight of methyl salicylate and the per cent of diisopropanolamine employed in preparing the same. The table also gives the yellowness index for each composition before and after exposure to light from an S-1 Sunlamp for a period of 500 hours, and for each composition before and after exposure to light from a carbon electrode arc lamp in a standard Fadeometer for 500 hours. The difference between the yellowness index before and after exposure to the light is a measure of the yellowing of the polystyrene due to the exposure to light. For purpose of comparison, test pieces of polystyrene containing no light stabilizers were prepared and tested by similar procedures.

*Table II*

| Run No. | Starting Materials | | | Color of Product | | | | | |
|---|---|---|---|---|---|---|---|---|---|
| | Percent Polystyrene | Percent Methyl Salicylate | Percent Diisopropanolamine | S-1 Sunlamp | | | Fadeometer | | |
| | | | | Yellowness Index | | Yellowing | Yellowness Index | | Yellowing |
| | | | | Before Exposure | After Exposure | | Before Exposure | After Exposure | |
| 1 | 100 | 0 | 0 | 2.4 | 11.5 | 9.1 | 2.4 | 26.9 | 24.5 |
| 2 | 99.92 | 0.04 | 0.04 | 2.0 | 4.7 | 2.7 | 2.2 | 4.6 | 2.4 |
| 3 | 99.6 | 0.2 | 0.2 | 3.2 | 6.4 | 3.2 | 3.1 | 4.7 | 1.6 |
| 4 | 99.2 | 0.4 | 0.4 | 3.2 | 4.9 | 1.7 | 3.1 | 3.3 | 0.2 |
| 5 | 98.8 | 0.6 | 0.6 | 3.3 | 5.8 | 2.5 | 3.6 | 4.2 | 0.6 |
| 6 | 98.4 | 0.8 | 0.8 | 3.4 | 6.4 | 3.0 | 3.8 | 5.9 | 2.1 |
| 7 | 98.0 | 1.0 | 1.0 | 3.8 | 7.4 | 3.6 | 2.7 | 7.4 | 3.7 |
| 8 | 97.0 | 1.5 | 1.5 | 4.1 | 7.7 | 3.6 | 4.1 | 7.2 | 3.1 |
| 9 | 96.0 | 2.0 | 2.0 | 4.0 | 7.2 | 3.2 | 3.7 | 6.7 | 3.0 |

EXAMPLE 3

In each of a series of experiments a composition comprising polystyrene, together with an alkanolamine and a salicylate as addition agents in amount and kind as specified in the following table was prepared by procedure similar to that described in Example 1. Each composition was made in total amount of 1000 grams. A portion of each composition was injection molded to form test pieces 2 x 2.5 inches by 0.1 inch thick. The test pieces were used to determine the degree of yellowing upon exposure to light employing procedures similar to those employed in example. Table III identifies each composition by naming the salicylate and alkanolamine addition agents employed and gives the proportions of said agents incorporated in each polystyrene composition. The table gives the yellowness index for each composition before and after exposure to light from an S-1 Sunlamp for a period of 500 hours and the yellowing produced by exposure to said light. The table also gives the yellowness index for each composition before and after exposure to light from a carbon electrode arc lamp in a standard Fadeometer for a period of 500 hours and the yellowing produced by exposure to said light.

Table III

| Run No. | Stabilizing Agents - Salicylate Kind | Percent | Stabilizing Agents - Alkanolamine Kind | Percent | S-1 Sunlamp Yellowness Index Before Exposure | S-1 Sunlamp Yellowness Index After Exposure | S-1 Sunlamp Yellowing | Fadeometer Yellowness Index Before Exposure | Fadeometer Yellowness Index After Exposure | Fadeometer Yellowing |
|---|---|---|---|---|---|---|---|---|---|---|
| 1 | Ethyl salicylate | 0.8 | none | 0 | 2.8 | 3.9 | 1.1 | 2.7 | 25.5 | 22.8 |
| 2 | none | 0 | Isopropanolamine | 0.8 | 5.5 | 15 | 9.5 | 5.4 | 14.0 | 8.6 |
| 3 | Ethyl salicylate | 0.4 | ...do... | 0.4 | 7.6 | 11.3 | 3.7 | 7.6 | 14.6 | 7.0 |
| 4 | Butyl salicylate | 0.8 | none | 0 | 2.9 | 4.5 | 1.6 | 2.7 | 14.5 | 11.8 |
| 5 | none | 0 | N-(2-hydroxyethyl)diisopropanolamine | 0.8 | 3.5 | 12.2 | 8.7 | 3.5 | 11.7 | 8.2 |
| 6 | Butyl salicylate | 0.4 | ...do... | 0.4 | 3.4 | 4.9 | 1.5 | 3.4 | 10.5 | 7.1 |
| 7 | Octyl salicylate | 0.8 | none | 0 | 2.6 | 4.0 | 2.4 | 2.6 | 23.2 | 20.6 |
| 8 | ...do... | 0.4 | N-(2-hydroxyethyl)diisopropanolamine | 0.4 | 3.7 | 5.0 | 1.3 | 3.2 | 8.6 | 5.4 |
| 9 | ...do... | 0.4 | Diethanolamine | 0.4 | 3.1 | 10.7 | 7.6 | 3.2 | 5.9 | 2.7 |
| 10 | none | 0 | ...do... | 0.8 | 4.5 | 18.6 | 14.1 | 6.2 | 9.5 | 3.3 |
| 11 | Isoamyl salicylate | 0.8 | none | 0 | 2.6 | 4.1 | 1.5 | 2.8 | 14.3 | 11.5 |
| 12 | ...do... | 0.4 | Diisopropanolamine | 0.4 | 3.0 | 4.7 | 1.7 | 3.2 | 3.7 | 0.5 |
| 13 | Ethylene glycol disalicylate | 0.6 | none | 0 | 3 | 8 | 5 | 3 | 17 | 14 |
| 14 | none | 0 | N-(2-hydroxyethyl)diisopropanolamine | 0.6 | 2 | 17.5 | 15.5 | 2 | 20 | 18 |
| 15 | Ethylene glycol disalicylate | 0.3 | ...do... | 0.3 | 5.5 | 15 | 9.5 | 5.5 | 10 | 4.5 |
| 16 | Methyl salicylate | 0.8 | none | 0 | 2.0 | 8.5 | 6.5 | 20 | 2.5 | 0.5 |
| 17 | none | 0 | 2-(morpholino)ethanol | 0.8 | 3.2 | 11.3 | 8.1 | 3.2 | 3.3 | 0.1 |
| 18 | Methyl salicylate | 0.4 | ...do... | 0.4 | 3.5 | 4.8 | 1.3 | 3.5 | 4.0 | 0.5 |

EXAMPLE 4

A charge of 992 grams of a batch of a granular copolymer of approximately 75 per cent by weight styrene and 25 per cent alpha-methylstyrene, together with 3 grams of methyl salicylate and 5 grams of diisopropanolamine, was placed in a glass jar and blended until the materials were well mixed. The mixture was fed to a laboratory extruder wherein it was fused and extruded at temperatures between 400° and 410° F., then cooled and ground to a granular form. A portion of the composition was injection molded to form test pieces 2 x 2.5 inches by 0.1 inch thick. The test pieces were used to determine the yellowing of the composition upon exposure to light from an S-1 sunlamp for a period of 500 hours and also the yellowing of test pieces upon exposure to light from a carbon electrode arc lamp in a standard Fadeometer for 500 hours, employing procedures similar to those employed in Example 1. Table IV identifies the composition by giving the proportions and kind of ingredients from which it was prepared. The table also gives the yellowing of the composition upon exposure to light under the S-1 sunlamp and in the Fadeometer, respectively for a period of 500 hours. For purpose of comparison, the results obtained by exposure of test pieces of the copolymer without a stabilizing agent and test pieces of a composition of the copolymer and methyl salicylate and a composition of the copolymer and diisopropanolamine, respectively, are also included in the table.

Table IV

| Run No. | Starting Materials - Percent Polymer | Percent Methyl Salicylate | Percent Diisopropanolamine | Color of Product - S-1 Sunlamp Yellowing | Fadeometer Yellowing |
|---|---|---|---|---|---|
| 1 | 100 | 0 | 0 | 8.9 | 14.7 |
| 2 | 99.2 | 0.8 | 0 | 2.5 | 12.3 |
| 3 | 99.2 | 0 | 0.8 | 6.3 | 0.6 |
| 4 | 99.2 | 0.3 | 0.5 | 2.3 | 0.6 |

EXAMPLE 5

A charge of 992 grams of a batch of granular polyvinyltoluene together with 3 grams of methyl salicylate and 5 grams of diisopropanolamine, was placed in a glass jar and rolled until the materials were well mixed. The mixture was fed to a laboratory extruder wherein it was used and extruded at temperatures between 400° and 410° F. then cooled and ground to a granular form. Molded test pieces of the composition were used to determine a yellowing upon exposure to light employing procedures similar to those employed in Example 1. Table V identifies the composition and gives the yellowing of the composition upon exposure to molded test pieces of the same to light from a carbon electrode arc lamp in a Fadeometer for a period of 500 hours. For purpose of comparison, the results obtained by exposure of molded test pieces of the polyvinyltoluene without a stabilizing agent and exposure of test pieces of a composition of the polyvinyltoluene and methyl salicylate and a composition of diisopropanolamine and polyvinyltoluene under similar conditions are included in the table.

Table V

| Run No. | Starting Materials - Percent Polymer | Percent Methyl Salicylate | Percent Diisopropanolamine | Color of Product - Fadeometer |
|---|---|---|---|---|
| 1 | 100 | 0 | 0 | 27.8 |
| 2 | 99.2 | 0.8 | 0 | 26.1 |
| 3 | 99.2 | 0 | 0.8 | 1.1 |
| 4 | 99.2 | 0.3 | 0.5 | 0.7 |

We claim:

1. A composition of matter comprising a resinous thermoplastic polymer selected from the group consisting of at least one polymerized monovinyl aromatic hydrocarbon of the benzene series and copolymers of a major proportion of at least one such monovinyl aromatic hydrocarbon and a minor proportion of an alkenyl aromatic hydrocarbon of the benzene series having a single isopropenyl radical directly attached to a carbon atom of the aromatic nucleus, and as stabilizing agents for inhibiting discoloring of the polymer upon exposure to light, from 0.04 to 2 per cent by weight of a salicylic acid ester selected from the group consisting of ethylene glycol disalicylate propylene glycol disalicylate and esters of salicylic acid having the general formula:

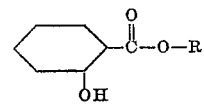

wherein R represents an alkyl radical containing from 1 to 8 carbon atoms, and from 0.04 to 2 per cent by weight of an alkanolamine having the general formula:

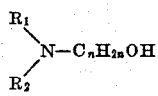

wherein $n$ is an integer from 2 to 3 and $R_1$ and $R_2$ represent at least one member of the group consisting of hydrogen, an alkyl radical containing from 1 to 4 carbon atoms, the radical $-C_nH_{2n}OH$ wherein $n$ is an integer from 2 to 3 and the bivalent radical:

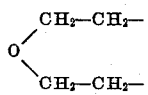

wherein both valences are attached to the nitrogen atom of the alkanolamine, the representation of the monovalent members just mentioned being by $R_1$ and $R_2$ individually and of said bivalent radical being by $R_1$ and $R_2$ collectively.

2. A composition of matter comprising at least one polymerized monovinyl aromatic hydrocarbon of the benzene series and as stabilizing agents for inhibiting discoloring of the polymer upon exposure to light, from 0.04 to 2 per cent by weight of a salicylic acid ester having the general formula:

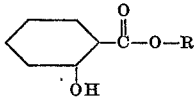

wherein R represents an alkyl radical containing from 1 to 8 carbon atoms, and from 0.04 to 2 per cent of an alkanolamine having the general formula:

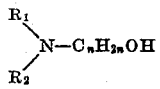

wherein $n$ is an integer from 2 to 3 and $R_1$ and $R_2$ represent at least one member of the group consisting of hydrogen, an alkyl radical containing from 1 to 4 carbon atoms, the radical $-C_nH_{2n}OH$ wherein $n$ is an integer from 2 to 3, and the bivalent radical:

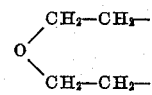

wherein both valences are attached to the nitrogen atom of the alkanolamine, the representation of the monovalent members just mentioned being by $R_1$ and $R_2$ individually and of said bivalent radical being by $R_1$ and $R_2$ collectively.

3. A composition of matter as claimed in claim 2, wherein the polymerized monovinyl aromatic hydrocarbon is polystyrene.

4. A composition of matter as claimed in claim 2, wherein the alkyl salicylate is methyl salicylate.

5. A composition of matter as claimed in claim 2, wherein the alkanolamine is diisopropanolamine.

6. A composition of matter comprising polystyrene and as stabilizing agents for inhibiting discoloring of the polystyrene upon exposure to light from 0.05 to 1 per cent by weight of methyl salicylate and from 0.05 to 1 per cent of diisopropanolamine.

7. A composition of matter comprising polyvinyltoluene and as stabilizing agents for inhibiting discoloring of the polyvinyltoluene upon exposure to light, from 0.05 to 1 per cent by weight of methyl salicylate and from 0.05 to 1 per cent of diisopropanolamine.

8. A composition of matter comprising a copolymer of from 60 to 99 per cent by weight of styrene and from 40 to 1 per cent of alpha-methylstyrene and as stabilizing agents for inhibiting discoloring of the copolymer upon exposure to light, from 0.05 to 1 per cent by weight of methyl salicylate and from 0.05 to 1 per cent of diisopropanolamine.

9. A composition of matter comprising polystyrene and as stabilizing agents for inhibiting discoloring of the polystyrene upon exposure to light, from 0.05 to 1 per cent by weight of ethylene glycol disalicylate and from 0.05 to 1 per cent of diisopropanolamine.

References Cited in the file of this patent

UNITED STATES PATENTS 2,617,748    Bjorksten et al. _____ Nov. 11, 1952